United States Patent
Li et al.

(10) Patent No.: US 9,166,759 B2
(45) Date of Patent: Oct. 20, 2015

(54) METHOD AND DEVICE FOR TRANSMITTING CONTROL INFORMATION IN WIRELESS COMMUNICATION SYSTEM

(71) Applicant: NTT DoCoMo, Inc., Tokyo (JP)

(72) Inventors: Anxin Li, Beijing (CN); Atsushi Harada, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 102 days.

(21) Appl. No.: 14/196,856

(22) Filed: Mar. 4, 2014

(65) Prior Publication Data

US 2014/0254461 A1 Sep. 11, 2014

(30) Foreign Application Priority Data

Mar. 6, 2013 (CN) .......................... 2013 1 0070616

(51) Int. Cl.
*H04L 1/00* (2006.01)
*H04L 5/00* (2006.01)
*H04L 12/18* (2006.01)

(52) U.S. Cl.
CPC ................ *H04L 5/0053* (2013.01); *H04L 1/00* (2013.01); *H04L 1/004* (2013.01); *H04L 1/0046* (2013.01); *H04L 1/0061* (2013.01); *H04L 1/0072* (2013.01); *H04L 1/0075* (2013.01); *H04L 12/18* (2013.01); *H04L 1/0004* (2013.01); *H04L 1/0026* (2013.01); *H04L 2001/0093* (2013.01)

(58) Field of Classification Search
CPC ........... H04W 4/06; H04W 4/08; H04W 4/10; H04W 28/02; H04W 28/0205; H04W 28/021; H04W 28/0215

USPC ......... 370/229, 239, 231, 235, 310, 328, 329, 370/330, 341

See application file for complete search history.

(56) References Cited

U.S. PATENT DOCUMENTS 8,341,493 B2 * 12/2012 Sun et al. ...................... 714/758
8,718,201 B2 * 5/2014 Lane et al. .................... 375/340

FOREIGN PATENT DOCUMENTS

WO WO2013/068834 * 10/2012

* cited by examiner

*Primary Examiner* — Dady Chery
(74) *Attorney, Agent, or Firm* — Harness, Dickey & Pierce, PLC

(57) ABSTRACT

A method for transmitting control information in a wireless communication system includes: determining a link adaptation method of a user group according to quality of channels of each user in the user group; generating first control information according to common control information of all users in the user group and the link adaptation method corresponding to the user group, and transmitting the first control information to each user in the user group; obtaining contents of second control information according to particular control information of each user in the user group; performing link adaptation process for the contents of the second control information according to the link adaptation method corresponding to the user group, generating the second control information, and transmitting the second control information to each user in the user group. Corresponding to the above-described method, a method for receiving control information in a wireless communication system and corresponding devices are also disclosed.

19 Claims, 4 Drawing Sheets

METHOD AND DEVICE FOR TRANSMITTING CONTROL INFORMATION IN WIRELESS COMMUNICATION SYSTEM

TECHNICAL FIELD

The present application relates to mobile communication technology, and more particularly, to a method and a device for transmitting control information in a wireless communication system.

BACKGROUND

In wireless communication systems, a plurality of users can share the same radio resource through non-orthogonally multiplexing. For convenience, the plurality of users using the same radio resource through non-orthogonally multiplexing is called users within a same user group. Currently, in wireless communication systems, different users within a user group can be assigned different power allocation coefficients so as to distinguish each user. Further, a user within the user group can receive data of its own through an interference cancellation process. In order to conduct interference cancellation, in addition to its own control information, e.g., signaling or information that assists data transmission, such as resource allocation information, channel coding rate, modulation and coding scheme, the user needs to know control information of users in previous interference cancellation stages. Therefore, the issue of how to transmit control information of users in a wireless communication system is to be addressed in the existing wireless communication systems.

SUMMARY

To address the above-mentioned issue, embodiments of the present disclosure provide a method and a device for transmitting and receiving control information in a wireless communication system.

A method for transmitting control information in a wireless communication system according to an embodiment of the present disclosure comprises: pre-assigning a group identification to each user group respectively, and determining a search space corresponding to each group identification respectively; determining a link adaptation method of a user group according to quality of channel of each user in the user group; generating contents of first control information according to common control information of all users in the user group and the link adaptation method corresponding to the user group; performing cyclic redundancy check for the contents of the first control information, generating the first control information, and then transmitting the first control information to each user in the user group; performing cyclic redundancy check for particular control information of each user in the user group and obtaining contents of second control information; performing link adaptation processing for the contents of the second control information according to the link adaptation method corresponding to the user group, generating the second control information, and transmitting the second control information to each user in the user group.

Determining a link adaptation method of a user group according to quality of channel of each user in the user group may comprise: determining code rate to be introduced when performing link adaptation processing for control information corresponding to each user respectively according to the quality of the channel of each user in the user group; selecting an appropriate parameter as a parameter for the link adaptation method corresponding to the user group according to the determined code rate to be introduced when performing the link adaptation processing for the control information corresponding to each user.

The link adaptation method may comprise adjusting code rate of rate matching, the link adaptation processing may comprise rate matching processing, and the parameter for the link adaptation method may comprise a rate matching parameter. Alternatively, the link adaptation method may comprise adjusting code rate of channel coding, the link adaptation processing may comprise channel coding processing, and the parameter for the link adaptation method may comprise a channel coding parameter.

The common control information may comprise at least resource allocation information and multiplexing order information of data transmission.

The contents of the above-mentioned first control information may be indicated with a joint indication manner or an independent indication manner. The first control information may comprise at least a resource allocation field, a multiplexing order field and a link adaptation method field. Here, the resource allocation field uses independent bits to indicate the resource allocation information, the multiplexing order filed uses independent bits to indicate the multiplexing order information of data transmission, and the link adaptation method field uses independent bits to indicate link adaptation method information. Alternatively, the first control information may comprise at least one data field, bits in the data field indicate at least two of the resource allocation information, the multiplexing order information of data transmission and link adaptation method information simultaneously.

The method may further comprise: after performing cyclic redundancy check for the contents of the first control information, scrambling a cyclic redundancy check code generated through the cyclic redundancy check with the group identification of the user group.

The particular control information of users may be information relating to transmission of user data.

Performing cyclic redundancy check for particular control information of each user in the user group may comprise: performing cyclic redundancy check for particular control information of each user in the user group using a manner in which each control information is applied the cyclic redundancy check in a nested mode or a manner in which each control information is applied the cyclic redundancy check independently.

The method may further comprise: scrambling a cyclic redundancy check code generated through the cyclic redundancy check with user identification of each user in the user group.

A method for receiving control information in a wireless communication system according to an embodiment of the present disclosure comprises: de-mapping a search space corresponding to a group identification of a user group to which a user itself belongs and obtaining candidate first control information; performing blind detection for the candidate first control information, obtaining first control information sent by a base station, and determining common control information of all users in the user group to which itself belongs and link adaptation method corresponding to the user group to which itself belongs; de-mapping the search space corresponding to the group identification of the user group to which itself belongs and obtaining candidate second control information; performing blind detection for the candidate second control information according to the common control information of all users in the user group to which itself belongs and the link adaptation method corresponding to the user group to which itself belongs, and obtaining particular control information of itself or of itself and other users.

Performing blind detection for the candidate second control information according to the common control information of all users in the user group to which itself belongs and the link adaptation method corresponding to the user group to which itself belongs may comprise: demodulating the candidate second control information according to the common control information of all users in the user group to which itself belongs; performing rate de-matching, channel decoding and cyclic redundancy check for the demodulated data according to the link adaptation method corresponding to the user group to which itself belongs.

If the base station performs cyclic redundancy check for the particular control information of each user in the user group with a manner in which each control information is applied the cyclic redundancy check in a nested mode, the user performs cyclic redundancy check in the order from inside to outside of the cyclic redundancy check; if the cyclic redundancy check result is correct, the user stops decoding and outputs all of the particular control information of each user until this cyclic redundancy check; if the cyclic redundancy check result is incorrect, the user continues to decode until the next cyclic redundancy check; and if there is no any correct cyclic redundancy check result, the user considers itself as not being scheduled.

If the base station performs cyclic redundancy check for the particular control information of each user in the user group with a manner in which each control information is applied the cyclic redundancy check independently, the user performs cyclic redundancy check for the particular control information of each user independently; if there is a correct cyclic redundancy check result, obtaining the particular control information of the corresponding user; if there is no correct cyclic redundancy check result, the user considers itself as not being scheduled.

A base station according to an embodiment of the present disclosure comprises:

a configuration unit, for pre-assigning a group identification to each user group respectively, and determining a search space corresponding to each group identification respectively;

a link adaptation method determining unit, for determining a link adaptation method of a user group according to quality of channel of each user in the user group;

a first control information transmitting unit, for generating contents of first control information according to common control information of all users in the user group and the link adaptation method corresponding to the user group, performing cyclic redundancy check for the contents of the first control information, generating the first control information, and then transmitting the first control information to each user in the user group; and a second control information transmitting unit, for performing cyclic redundancy check for particular control information of each user in the user group, obtaining contents of second control information, performing link adaptation processing for the contents of the second control information according to the link adaptation method corresponding to the user group, generating the second control information, and transmitting the second control information to each user in the user group.

The first control information transmitting unit may further scramble a cyclic redundancy check code generated through the cyclic redundancy check with the group identification of the user group after performing cyclic redundancy check for the contents of the first control information.

When performing cyclic redundancy check for the particular control information of each user in the user group, the second control information transmitting unit may use a manner in which each control information is applied the cyclic redundancy check in a nested mode or a manner in which each control information is applied the cyclic redundancy check independently.

The second control information transmitting unit may further scramble a cyclic redundancy check code generated through the cyclic redundancy check with user identification of each user in the user group.

With the above mentioned method, base station and UE for transmitting and receiving control information, on one hand, since the base station sends the control information to be sent via two pieces of control information, the complexity of blind detection by the user is greatly reduced; on the other hand, since different code rates are used when performing link adaptation process for the second control information according to the quality of channels of each user, that is, different amount of redundancy information are introduced for users with different quality of channels, the signaling overhead is greatly reduced while ensuring the second control information can be accurately received by users at edges.

Further, according to existing protocols, if the base station needs to send other common control information, such as paging information, system information, power control information and the like, the base station will send additional control information in a common search space.

DETAILED DESCRIPTION

Figure 1:
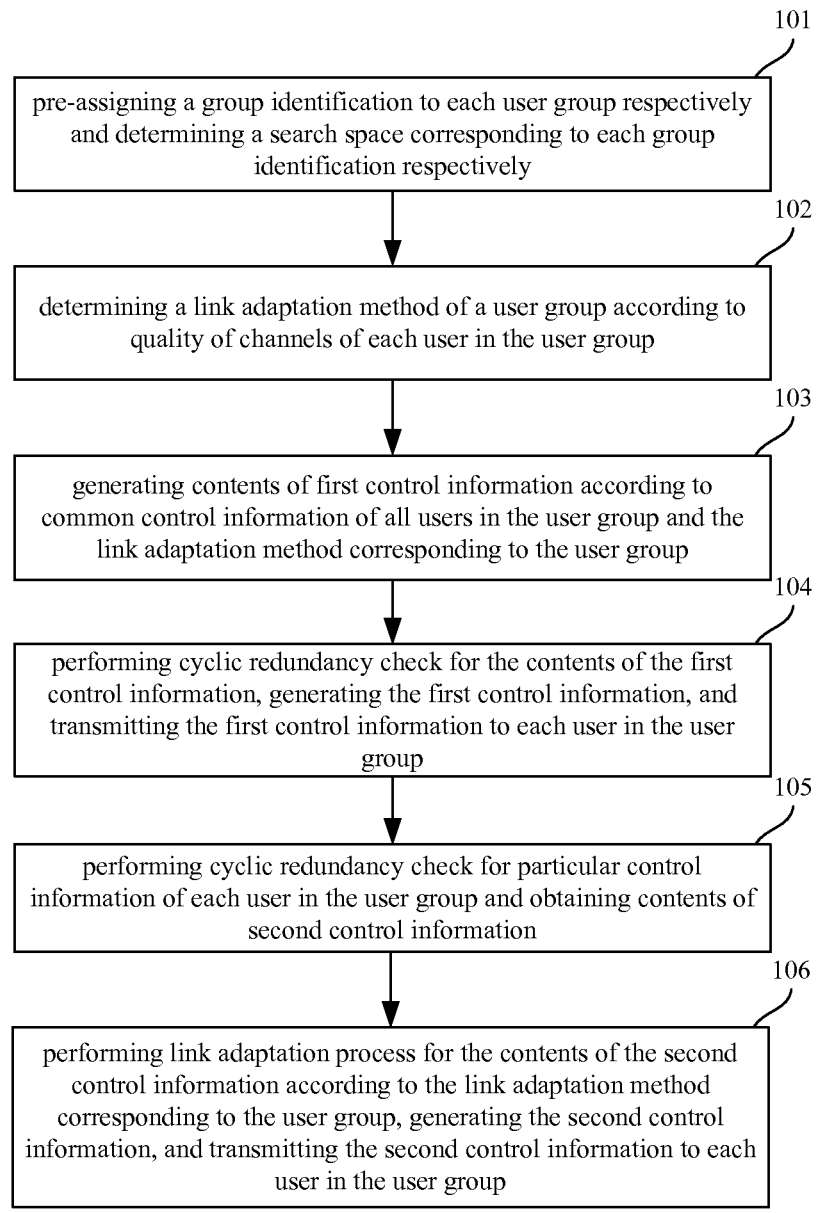
FIG. 1 shows a method for transmitting control information in a wireless communication system according to an embodiment of the present disclosure.

To address the issue of how to transmit control information in a radio communication system, an embodiment of the present disclosure firstly discloses a method for transmitting control information in a wireless communication system. FIG. 1 shows a method for transmitting control information by a base station (eNode B) in a wireless communication system according to an embodiment of the present disclosure. As shown in FIG. 1, the method includes the following steps:

At block 101, a group identification (Group ID) to each user group is pre-assigned respectively, and a search space corresponding to each group identification is determined respectively.

Users can be divided into different user groups by a base station according to the quantity of users in a cell and quality of channels of the users. For example, if the number of users in the cell is small, only one user group can be set up by the base station and all users in the cell belong to this user group. Instead, if the number of users in the cell is large, a plurality of user groups can be set up by the base station and each user group can contain one or more users. In addition users can be divided into different user groups based on the quality of channels of users. Usually users with large difference in channel quality are divided into a group to obtain a better performance gain.

In the case of enhanced physical downlink control channel (ePDCCH), search spaces of users in a user group can be configured to be identical or partially overlapping through high layer signaling, so that the control information can be placed in the identical or overlapping search spaces for transmission. In the present embodiment, the search space which is identical for each user in the user group or the overlapping part of search spaces for users is referred as a search space of the user group, i.e. a search space corresponding to the group identification of the user group.

At block 102, a link adaptation method of a user group is determined according to quality of channels of each user in the user group.

In this step, the eNode B may firstly determine the users who will be scheduled according to the quality of the channels of each user in the user group, then determine code rate to be introduced when performing link adaptation process for particular control information of each user being scheduled respectively, and then select appropriate parameters as parameters for the link adaptation corresponding to the user group according to the determined code rate to be introduced when performing the link adaptation for particular control information of each user being scheduled. Specifically, the above-described link adaptation method includes adjusting the code rate of rate matching, adjusting the code rate of channel coding and the like. The above-described link adaptation process includes a rate matching process, a channel coding process and the like. Correspondingly, the above-described parameters for the link adaptation include a rate matching parameter, a code rate parameter of channel coding and the like.

In the present embodiment, the parameters for link adaptation of a user group prescribe the code rate to be introduced when performing link adaptation process for particular control information of each user being scheduled in the user group in the following operations. Specifically, the above-described parameters for link adaptation may include a coding rate set $a=\{a_i\}$, $i=1 \ldots M$, $0<a_i \leq 1$, wherein M represents the number of users being scheduled in the user group, which is less than or equal to the number of users in the user group, i.e. the multiplexing order of data transmission. $a_i$ represents the code rate to be introduced when performing link adaptation process for particular control information of the ith user being scheduled in the user group, and can show the quantity of redundancy information introduced in the link adaptation process. Usually a low code rate indicates more redundancy information, and a high code rate indicates less redundancy information. For example, if the quality of channel of a user being scheduled is good, the code rate to be introduced when performing link adaptation process for particular control information of this user can be high, that is, the redundancy information to be introduced is less, which can reduce signaling overhead. Instead, if the quality of channel of a user being scheduled is not good, the code rate to be introduced when performing link adaptation process for particular control information of this user can be low, that is, the redundancy information to be introduced is more, which can ensure accurate reception of the control information.

It should be noted that the above-described channel quality can be indicated by parameters such as signal to noise ratio, signal to interference plus noise ratio or channel gain, etc. Among them, as understood by those skilled in the art, the higher the signal to noise ratio, the signal to interference plus noise ratio or the channel gain is, the better the channel quality is, while the lower the signal to noise ratio, the signal to interference plus noise ratio or the channel gain is, the worse the channel quality is.

At block 103, contents of first control information are generated according to common control information of all users in the user group and the link adaptation method corresponding to the user group.

The above-mentioned common control information of all users in the user group refers to common control information of all of the users being scheduled in the user group.

In this step, the process of generating the contents of the first control information according to common control information of all of the users being scheduled in the user group and the link adaptation method corresponding to the user group may include: setting the common control information of all of the users being scheduled in the user group and the link adaptation method corresponding to the user group as all or a part of the contents of the first control information.

Here, the common control information of all users in the user group is a common part of control information of all of the users being scheduled in the user group, and at least includes resource allocation information (RA) and multiplexing order information of data transmission (M). For convenience of description, it will be referred to as common control information hereinafter.

It is noted that, in the present embodiment, the contents of the above-mentioned first control information may be indicated with a joint indication manner or an independent indication manner. In the case of the independent indication manner, the first control information includes a plurality of data fields. Independent bits are used to indicate the meaning of each of the date fields, that is, the first control information may include at least a resource allocation field, a multiplexing order field and a link adaptation method field. Among them, the resource allocation field uses independent bits to indicate the resource allocation information, the multiplexing order filed uses independent bits to indicate the multiplexing order information of data transmission, and the link adaptation method field uses independent bits to indicate link adaptation method information. In the case of the joint indication manner, the first control information may include only one data field. Bits in the data field indicate at least two of the resource allocation information, the multiplexing order information of data transmission and link adaptation method information simultaneously. Of course, in practical applications, the above-mentioned two indication manners can be combined, that is, a part of the information, such as the resource allocation information, uses the independent indication manner while the other information, such as the link adaptation method information and the multiplexing order information of data transmission, uses the joint indication manner.

It is noted that in addition to the method of the eNode B transmitting the link adaptation method information directly, all possible link adaptation methods under various multiplexing orders may be stored in the eNode B and a user side in advance, and an index is assigned for each link adaptation method under various multiplexing orders. In this case, the first control information sent by the eNode B can only carry indexes of the resource allocation information (RA), the multiplexing order information of data transmission (M) and the link adaptation method (LA), and the user can determine the link adaptation method of the user group to which itself belongs according to the indexes of the multiplexing order information of data transmission (M) and the link adaptation method (LA).

At block 104, cyclic redundancy check is performed for the contents of the first control information to generate the first control information, and then the first control information is transmitted to each user in the user group.

In this step, the eNode B may further scramble a cyclic redundancy check code generated through the cyclic redundancy check with the group identification (Group ID) of the user group.

It is noted that transmitting the first control information to each user in the user group in this step may include the steps of: the eNode B performing channel coding, rate matching and modulation for the information after the cyclic redundancy check; and then, completing mapping to a control channel element (CCE) and a search space corresponding to the group identification of the user group. In the rate matching process, the resource allocation information (RA), the multiplexing order information of data transmission (M) and the link adaptation method (LA) or their indexes are link self-adapted with the same code rate. It is noted that the channel coding, the rate matching, the modulation and the mapping operation to the control channel element (CCE) and the search space can refer to those in an existing control information transmission process in an orthogonal access system.

At block 105, cyclic redundancy check is performed for particular control information of each user in the user group to obtain contents of second control information.

In this step, the data after a cyclic redundancy check may be set as all or a part of the contents of the second control information.

Here, the particular control information of each user is information relating with transmission of user data, such as channel coding rate and modulation and coding scheme (MCS) used in data transmission. It is indicated with pDCI (private-DCI) in the following description and the attached drawings.

In detail, the process of performing cyclic redundancy check for the particular control information of each user in the user group in the step may be realized with a manner in which each control information is performed the cyclic redundancy check in a nested mode (referred to as a nested cyclic redundancy check manner hereinafter) or a manner in which each control information is performed the cyclic redundancy check independently (referred to as an independent cyclic redundancy check manner hereinafter). Among them, the nested cyclic redundancy check manner means performing cyclic redundancy check for control information of a plurality of users in a nested mode while the independent cyclic redundancy check manner means performing cyclic redundancy check for control information of each user independently. Further, in this step, the eNode B may further scramble a cyclic redundancy check code generated through the cyclic redundancy check with the user identification of each user being scheduled in the user group.

At block 106, a link adaptation process is performed for the contents of the second control information according to the link adaptation method corresponding to the user group to generate the second control information, and the second control information is transmitted to each user in the user group.

Since the link adaptation method corresponding to the user group prescribes code rate to be introduced when performing link adaptation process for particular control information of each user in the user group in the following operations, referred to as code rate corresponding to each user. Therefore, in the link adaptation process in the step, the eNode B performs link adaptation process for particular control information of each user and the cyclic redundancy check code in the contents of the second control information according to the code rate corresponding to each user directly, that is, the lower the code rate is, the more redundancy is introduced; while the higher the code rate is, the less redundancy is introduced. The link adaptation method includes adjusting code rate of rate matching, adjusting code rate of channel coding and the like.

Furthermore, transmitting the second control information to each user in the user group in this step may include the steps of: the eNode B performing modulation for the data after being performed the cyclic redundancy check; and then, completing mapping to a control channel element (CCE) and the search space corresponding to the group identification of the user group. It is noted that the modulation and the mapping operation to the control channel element (CCE) and the search space can refer to those in an existing control information transmission process in an orthogonal access system.

At this point, the eNode B completes transmitting of all of the control information.

Figure 2:
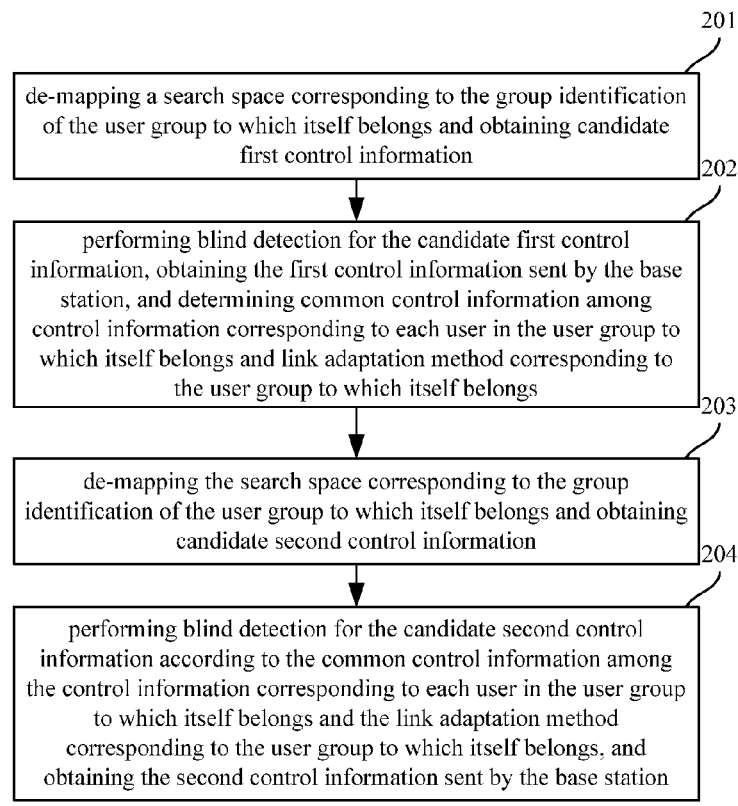
FIG. 2 shows a method for receiving control information in a wireless communication system according to an embodiment of the present disclosure.

FIG. 2 shows a method for receiving control information in a wireless communication system. As shown in FIG. 2, each user in the user group respectively performs the following steps:

At block 201, by de-mapping a search space corresponding to the group identification of the user group to which itself belongs, candidate first control information is obtained.

At block 202, blind detection is performed for the candidate first control information to obtain the first control information sent by the eNode B, and common control information is determined among control information corresponding to each user in the user group to which itself belongs and link adaptation method (LA) corresponding to the user group to which itself belongs.

As described above, through the determined common control information, the user can obtain resource allocation information of data transmission (RA) and multiplexing order information of data transmission of the user (M). Further, according to the multiplexing order information of data transmission of the user (M), the user can infer the possible size of the second control information in order to perform blind detection for the second control information.

In addition, through the determined link adaptation method (LA) corresponding to the user group to which itself belongs, the user can know how to receive the second control information.

The blind detection in this step includes the steps of demodulation, rate de-matching, channel decoding and cyclic redundancy check which correspond to the operations by the eNode B. It is noted that, the operations of demodulation, rate de-matching, channel decoding and cyclic redundancy check can refer to those in an existing control information transmission process in an orthogonal access system. If the eNode B once scrambled the cyclic redundancy check code generated through the cyclic redundancy check with the group identification (Group ID) of the user group, in this step, the user also needs to descramble the cyclic redundancy check code carried in the first control information with the group identification of the user group.

At block 203, the search space corresponding to the group identification of the user group to which itself belongs is de-mapped to obtain candidate second control information.

At block 204, blind detection is performed for the candidate second control information according to the common control information among the control information corresponding to each user in the user group to which itself belongs and the link adaptation method corresponding to the user group to which itself belongs, to obtain particular control information among control information of itself or of itself and other users.

The blind detection in this step includes the steps of demodulation, rate de-matching, channel decoding and cyclic redundancy check which correspond to the operations by the eNode B. If rate matching parameters were adjusted to realize that different users have different code rates in the link adaptation process, when rate de-matching is performed, the user needs to perform rate de-matching according to the rate matching parameters corresponding to the user group to which it belongs. Specifically, the user performs correlation combination for redundancy information introduced in the rate matching according to rate matching parameters, so as to obtain a combination gain. The combination method may be a conventional method, such as a maximum ratio combination method, an equal gain combination method and the like. Since the numbers of redundant information introduced by different users are different, the sizes of the combination gain obtained through rate de-matching for different users are different also. The more redundancy is, the more the user obtains the combination gain; while the less redundancy is, the less the user obtains the combination gain. The result after rate de-matching and combination is used as an input for code decoding. If channel coding parameters were adjusted to realize that different users have different code rates in the link adaptation process, when channel decoding is performed, the user needs to perform channel decoding according to the channel coding parameters corresponding to the user group to which it belongs. Specifically, the user performs rate de-matching for the demodulated signals, and then performs channel decoding for the signals after being rate de-matched according to the channel coding parameters, so as to obtain the channel coding gain. The channel decoding method may be a conventional method such as Viterbi decoding algorithm. Since the numbers of redundant information introduced by different users are different, the sizes of the channel coding gain obtained through channel coding for different users are different also. The more redundancy is, the more the user obtains the channel coding gain; while the less redundancy is, the less the user obtains the channel coding gain. In addition, rate matching parameters and channel coding parameters can be simultaneously adjusted to realize objective that different users have different code rates, in this case, the user needs to perform rate de-matching and channel decoding according to the rate matching parameters and the channel coding parameters corresponding to the user group to which itself belongs. As described above, the eNode B can use a manner in which each control information is performed the cyclic redundancy check in a nested mode (referred to as a nested cyclic redundancy check manner for short) or a manner in which each control information is performed the cyclic redundancy check independently (referred to as an independent cyclic redundancy check manner in short). For different cyclic redundancy check manners, the channel decoding processing is different. In the case of the nested cyclic redundancy check, the user performs channel decoding in the order from inside to outside of the cyclic redundancy check, for example using the Viterbi decoding algorithm, and then calculates the cyclic redundancy check codes in the order from inside to outside of the cyclic redundancy check, i.e., $CRC1, CRC2, \ldots, CRC_M$. In the channel decoding process, if a certain cyclic redundancy check result is correct, the user stops decoding and outputs all of the particular control information of each user until this cyclic redundancy check. Instead, if the cyclic redundancy check result is incorrect, the user continues to decode until the next cyclic redundancy check. If there is no any correct cyclic redundancy check result in the channel decoding process, the user considers itself as not being scheduled. If the eNode B once scrambled the cyclic redundancy check code generated through the cyclic redundancy check with identification of each user in the user group, in this step, the user needs to descramble the cyclic redundancy check code carried in the second control information with the identification of itself. In the case of the independent cyclic redundancy check, the user can perform channel decoding and cyclic redundancy check for particular control information of M users independently. If there is a correct cyclic redundancy check result, the user may consider itself as being scheduled and obtain the particular control information of the corresponding user. Instead, if there is no correct cyclic redundancy check result, the user may consider itself as not being scheduled. If the eNode B once scrambled the cyclic redundancy check code generated through the cyclic redundancy check with identification of each user in the user group, in this step, the user also needs to descramble the cyclic redundancy check code carried in the second control information with the identification of each user in the group. It is noted that the demodulation operation may refer to that in a control information transmission process in an existing wireless communication system.

At this point, the user side completes receiving of all of the control information.

The method for transmitting and receiving control information according to the present disclosure will be described in detail through a specific example hereinafter.

Figure 3:
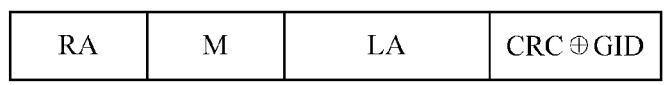
FIG. 3 shows an example of first control information.

FIG. 3 shows an example of the first control information. As shown in FIG. 3, the first control information includes the resource allocation information (RA), the multiplexing order information of data transmission (M) and the link adaptation method information of the user group (LA). Meanwhile, the cyclic redundancy check code obtained by performing cyclic redundancy check for the above-described information needs to be scrambled with the group identification (GID).

As described above, the resource allocation information (RA), the multiplexing order information of data transmission (M) and the link adaptation method information of the user group (LA) in the first control information can be indicated by either the independent indication manner or the joint indication manner.

Figure 4:
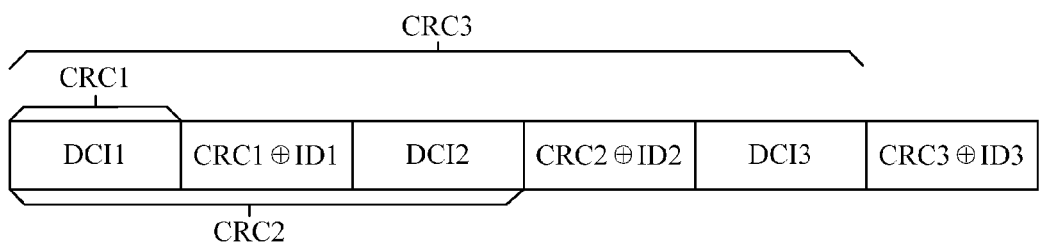
FIG. 4 shows an example of second control information.
Figure 5:
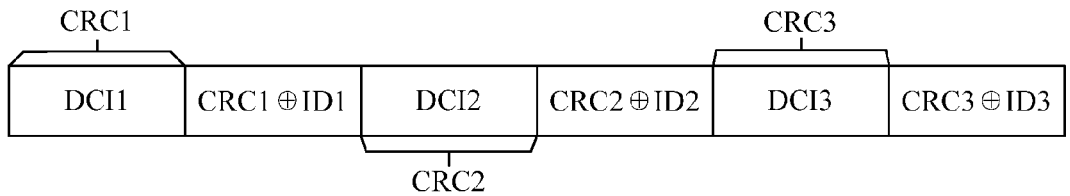
FIG. 5 shows another example of the second control information.

FIGS. 4 and 5 shows an example of the second control information respectively. In these two examples, the multiplexing order of data transmission is assumed as 3, thus the second control information includes three particular kind of control information. Among them, the meaning of each field is expressed as follows: $pDCI_m$: particular control information of the mth user; $D_m$: the identification of the mth user; $CRC_m$: the cyclic redundancy check code corresponding to the mth user. Here, the $CRC_m$ carried in the second control information is scrambled with the IDm.

FIGS. 4 and 5 show two manners of calculating the cyclic redundancy check code: the nested cyclic redundancy check and the independent cyclic redundancy check. In the case of the nested cyclic redundancy check, as shown in FIG. 4, $CRC_m$ is obtained by calculating all of the previous information bits. Those skilled in the art will understand that this nested cyclic redundancy check manner will lead to a better performance on packet error rate. In the case of the independent cyclic redundancy check, as shown in FIG. 5, CRCm is obtained by calculating bits of the previous control information $DCI_m$. Those skilled in the art will also understand that parallel processing can be used in this independent cyclic redundancy check, thus reducing delay of decoding.

The process of the eNode B processing the second control information will be described in detail hereinafter, with the nested cyclic redundancy check as an example.

Figure 6:
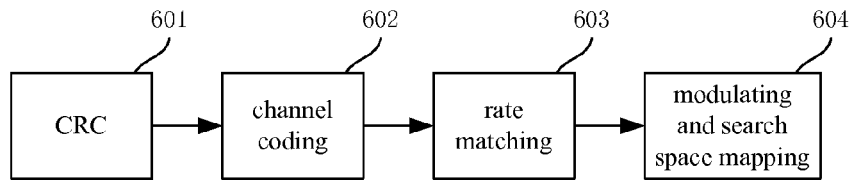
FIG. 6 shows a process of processing the second control information by a base station according to an embodiment of the present disclosure.

FIG. 6 shows a process of processing the second control information by the eNode B according to the present embodiment. As shown in FIG. 6, first, in step 601, the eNode B calculates the cyclic redundancy check code using the nested cyclic redundancy check manner as shown in FIG. 5, and cascades the particular control information of the users in the user group together. In step 602, the eNode B performs channel coding and interleaving for the cascaded control information according to the link adaptation method corresponding to the user group. It should be noted that the operation of interleaving is optional, that is, the eNode B does not perform interleaving for the bits obtained after channel coding. Next, in step 603, the eNode B performs rate matching for the bits obtained after channel coding according to the link adaptation method corresponding to the user group. In steps 602 and 603, the eNode B needs to introduce different redundancy for different users according to quality of the channels of users. It will be described hereinafter using an example in which the eNode B realizes the objective that different users have different redundancy through adjusting rate matching parameters. The following Tables 1 and 2 show all possible rate matching methods when the multiplexing orders are 2 and 3 and the set consisting of all rate matching redundancy is {1, ½, ⅓, ¼} respectively. The rate matching redundancy being 1 means that the rate matching does not introduce additional redundancy, ½ means that the rate matching introduces two times of redundancy, ⅓ means that the rate matching introduces three times of redundancy, and ¼ means that the rate matching introduces four times of redundancy. As shown in Tables 1 and 2, different indexes can be assigned to different rate matching methods. If Tables 1 and 2 are pre-stored in the eNode B and in the users, the eNode B can instruct the users to select a link adaptation method through informing the users the indexes of rate matching. As shown in Tables 1 and 2, a link adaptation method in the existing system can be included in the tables also, that is, all users use the same processing and have the same redundancy, so that the number of indexes of rate matching is reduced and therefore the signaling overhead is reduced. For example, when M=2, {¼, ¼}, {⅓, ⅓}, {½, ½} and {1, 1} can be achieved by index 1. After completing the rate matching processing, in step 604, the eNode B modulates the bits after rate matching and mapping them to the control channel element (CCE) and the search space corresponding to the group identification of the user group.

TABLE 1

| Index of rate matching parameter | Rate matching parameter when M = 2 |
|---|---|
| 1 | The code rates of all users are the same |
| 2 | {1/4, 1/3} |
| 3 | {1/4, 1/2} |
| 4 | {1/4, 1} |
| 5 | {1/3, 1/2} |
| 6 | {1/3, 1} |
| 7 | {1/2, 1} |

TABLE 2

| Index of rate matching parameter | Rate matching parameter when M = 3 |
|---|---|
| 1 | The code rates of all users are the same |
| 2 | {1/4, 1/4, 1/3} |
| 3 | {1/4, 1/4, 1/2} |
| 4 | {1/4, 1/4, 1} |
| 5 | {1/4, 1/3, 1/3} |
| 6 | {1/4, 1/3, 1/2} |
| 7 | {1/4, 1/3, 1} |
| 8 | {1/4, 1/2, 1/2} |
| 9 | {1/4, 1/2, 1} |
| 10 | {1/4, 1, 1} |
| 11 | {1/3, 1/3, 1/2} |
| 12 | {1/3, 1/3, 1} |
| 13 | {1/3, 1/2, 1/2} |
| 14 | {1/3, 1/2, 1} |
| 15 | {1/3, 1, 1} |
| 16 | {1/2, 1/2, 1} |
| 17 | {1/2, 1, 1} |

Figure 7:
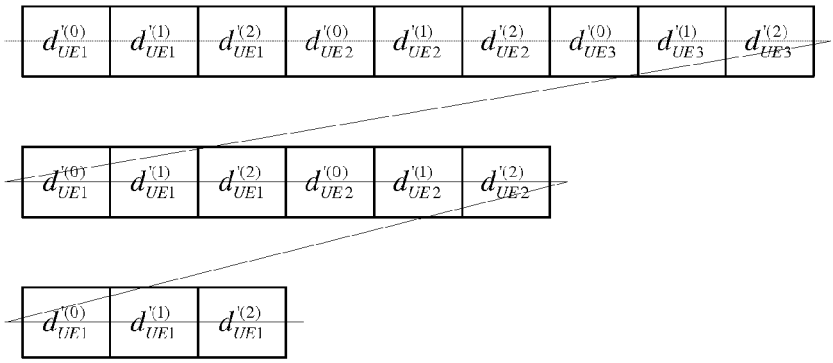
FIG. 7 shows an example of realizing a certain link adaptation through rate matching.
Figure 8:
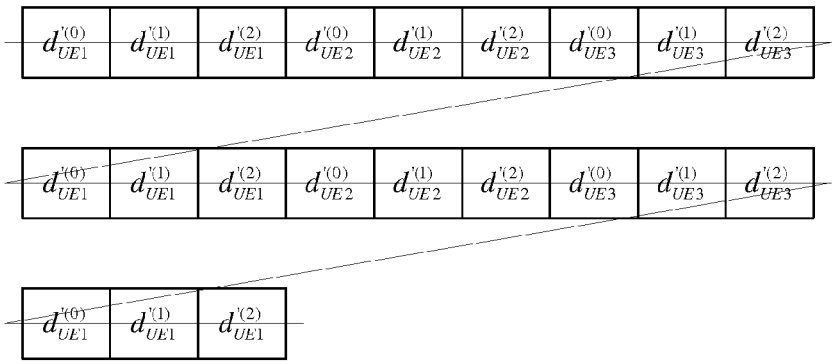
FIG. 8 shows another example of realizing a certain link adaptation through rate matching.

The method of rate matching will be described in detail hereinafter with reference to the accompanying drawings. FIGS. 7 and 8 show two examples of realizing a certain link adaptation method through rate matching, here, $d'_{UE1}{}^{(0)}$, $d'_{UE1}{}^{(1)}$ and $d'_{UE1}{}^{(2)}$ are the bits obtained after performing cyclic redundancy check and channel coding for the particular control information of a first user UE1, $d'_{UE2}{}^{(0)}$, $d'_{UE2}{}^{(1)}$ and $d'_{UE2}{}^{(2)}$ are the bits obtained after performing cyclic redundancy check and channel coding for the particular control information of a second user UE2, and $d'_{UE3}{}^{(0)}$, $d'_{UE3}{}^{(1)}$ and $d'_{UE3}{}^{(2)}$ are the bits obtained after performing cyclic redundancy check and channel coding for the particular control information of a third user UE3. Using the rate matching processing as shown in FIG. 7, the rate matching parameter can be realized as {⅓, ½, 1}, that is, in the rate matching, the code rate of UE1 is ⅓, the code rate of UE2 is ½ and the code rate of UE3 is 1, which also means in the rate matching, the bits of UE1 are repeated three times, the bits of UE2 are repeated two times and the bits of UE3 are repeated once. Using the rate matching process as shown in FIG. 8, rate matching parameter can be realized as {⅓, ½, ½}, that is, in the rate matching, the code rate of UE1 is ⅓, the code rate of UE2 is ½ and the code rate of UE3 is ½, which also means in the rate matching, the bits of UE1 are repeated three times, the bits of UE2 are repeated two times and the bits of UE3 are repeated two times.

Figure 11:
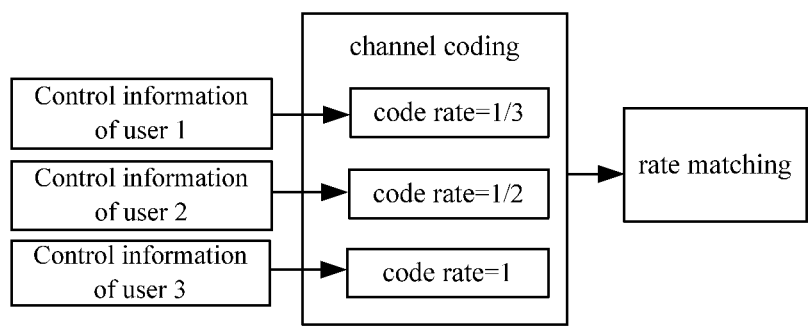
FIG. 11 shows an example of realizing a certain link adaptation method through channel coding.

As described above, in addition to the method of adjusting the code rate of the rate matching, the code rate of channel coding can be adjusted in the link adaptation process. In this case, the eNode B can introduce different redundancy for different users by adjusting the code rate of channel coding. FIG. 11 gives a specific example to realize the code rate parameter {⅓, ½, 1} of channel coding by adjusting the code rate of channel coding. As shown in FIG. 11, when performing channel coding, the eNodeB can use ⅓ as code rate for user 1, use ½ as code rate for user 2 and use 1 as code rate for user 3 so as to introduce different redundancy for user 1, user 2 and user 3. In addition, the eNode B can introduce different redundancy for different users by adjusting the rate matching parameters and the channel coding parameters simultaneously, the detailed description of which will be omitted herein.

The process of receiving the control information by the user will be described hereinafter in detail with an example.

For the first control information, the user first de-maps the search space corresponding to the group identification of the user group to which itself belongs and obtaining candidate first control information, performs blind detection (demodulation, rate de-matching, channel decoding and cyclic redundancy check) for the candidate first control information and obtains contents of the first control information sent by the eNode B, so as to determine common control information in control information corresponding to each user in the user group to which itself belongs and link adaptation method corresponding to the user group to which itself belongs.

For the second control information, the user first de-maps the search space corresponding to the group identification of the user group to which itself belongs and obtains candidate second control information, performs blind detection for the candidate second control information according to the common control information in the control information corresponding to each user in the user group to which itself belongs and the link adaptation method corresponding to the user group to which itself belongs, and obtains particular control information of itself and/or of other users. It should be noted that the user needs to calculate information of a plurality of cyclic redundancy checks in the process of channel decoding.

For example, in the case of the nested cyclic redundancy check, the user calculates the cyclic redundancy check codes in the order from inside to outside of the cyclic redundancy check, i.e., $CRC1, CRC2 \ldots CRC_M$. If the cyclic redundancy check result is correct, the user may stop decoding and output all of the particular control information of each user decoded. Instead, if the cyclic redundancy check result is incorrect, the user may continue to decode and perform the next cyclic redundancy check. If there is no any correct cyclic redundancy check result, the user may consider itself as not being scheduled.

In the case of the independent cyclic redundancy check, the user may perform decoding and cyclic redundancy check for particular control information of M users independently. If there is a correct cyclic redundancy check result, the user may consider itself as being scheduled and obtain the particular control information of the corresponding user. Instead, if there is no correct cyclic redundancy check result, the user may consider itself as not being scheduled.

Those skilled in the art will understand that, in the method of transmitting control information according to the present disclosure, on one hand, since the eNode B sends the control information to be sent via two pieces of control information, the complexity of blind detection by the user is greatly reduced; on the other hand, since different code rates are used when performing link adaptation process for the second control information according to the quality of channel of each user, that is, different amount of redundancy information are introduced for users with different quality of channel, the signaling overhead is greatly reduced while ensuring the second control information can be accurately received by users at edges.

Corresponding to the method of transmitting control information, an embodiment of the present disclosure discloses devices to perform the method, including a base station eNode B and a UE.

Figure 9:
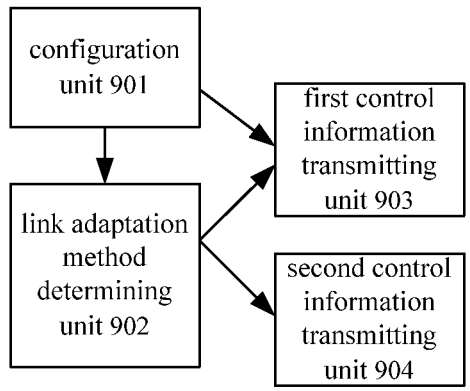
FIG. 9 is a schematic diagram illustrating an internal configuration of a base station according to an embodiment of the present embodiment.

As shown in FIG. 9, the internal structure of a base station (eNode B) provided by an embodiment of the present disclosure may include:

a configuration unit 901, for pre-assigning a group identification to each user group respectively, and determining a search space corresponding to each group identification respectively;

a link adaptation method determining unit 902, for determining a link adaptation method of a user group according to quality of channels of each user in the user group;

a first control information transmitting unit 903, for generating contents of first control information according to common control information of all users in the user group and the link adaptation method corresponding to the user group, performing cyclic redundancy check for the contents of the first control information, generating the first control information, and then transmitting the first control information to each user in the user group; and a second control information transmitting unit 904, for performing cyclic redundancy check for particular control information of each user in the user group, obtaining contents of second control information, performing link adaptation process for the contents of the second control information according to the link adaptation method corresponding to the user group, generating the second control information, and transmitting the second control information to each user in the user group.

Here, the link adaptation method determining unit 902 may include: a first module, for determining code rate to be introduced when performing link adaptation process for control information corresponding to each user respectively according to the quality of the channels of each user in the user group; and a second module, for selecting appropriate parameters as parameters for the link adaptation corresponding to the user group according to the determined code rate to be introduced when performing the link adaptation process for the control information corresponding to each user.

Further, after performing cyclic redundancy check for the contents of the first control information, the first control information transmitting unit 903 may further scramble a cyclic redundancy check code generated through the cyclic redundancy check with the group identification of the user group.

As described above, when performing cyclic redundancy check for the particular control information among control information corresponding to each user in the user group, the second control information transmitting unit 904 may use a manner in which each control information is applied the cyclic redundancy check in a nested mode or a manner in which each control information is applied the cyclic redundancy check independently.

The second control information transmitting unit 904 may further scramble a cyclic redundancy check code generated through the cyclic redundancy check with the user identification of each user in the user group.

Figure 10:
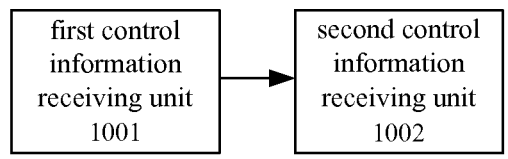
FIG. 10 is a schematic diagram illustrating an internal structure of a UE according to an embodiment of the present embodiment.

As shown in FIG. 10, the internal structure of a UE according to an embodiment of the present disclosure comprises:

a first control information receiving unit 1001, for de-mapping the search space corresponding to the group identification of the user group to which itself belongs, obtaining candidate first control information, performing blind detection for the candidate first control information, obtaining the first control information sent by the base station, and determining common control information among control information corresponding to each user in the user group to which itself belongs and a link adaptation method corresponding to the user group to which itself belongs; and a second control information receiving unit 1002, for de-mapping the search space corresponding to the group identification of the user group to which itself belongs, obtaining candidate second control information, performing blind detection for the candidate second control information according to the common control information among the control information corresponding to each user in the user group to which itself belongs and the link adaptation method corresponding to the user group to which itself belongs, and obtaining particular control information among control information of itself or of itself and other users.

Here, the second control information receiving unit 1002 firstly demodulates the candidate second control information according to the common control information among the control information corresponding to each user in the user group to which itself belongs, and then performs rate dematching, channel decoding and cyclic redundancy check for the demodulated data according to the link adaptation method corresponding to the user group to which itself belongs.

If the eNode B performs cyclic redundancy check for the particular control information among control information corresponding to each user in the user group with a manner in which each control information is applied the cyclic redundancy check in a nested mode, the second control information receiving unit 1002 in the UE performs cyclic redundancy check in the order from inside to outside of the cyclic redundancy check. If the cyclic redundancy check result is correct, the user stops decoding and outputs all of the particular control information of each user until this cyclic redundancy check; instead, if the cyclic redundancy check result is incorrect, the user continues to decode until the next cyclic redundancy check; and if there is no any correct cyclic redundancy check result, the user considers itself as not being scheduled.

If the eNode B performs cyclic redundancy check for the particular control information among control information corresponding to each user in the user group with a manner in which each control information is applied the cyclic redundancy check independently, the second control information receiving unit 1002 in the UE performs cyclic redundancy check for the particular control information among the control information corresponding to each user independently. If there is a correct cyclic redundancy check result, the particular control information of the corresponding user is obtained; instead, if there is no correct cyclic redundancy check result, the user considers itself as not being scheduled.

As described above, with the eNode B and the UE given in the embodiments of the present disclosure, on one hand, since the eNode B sends the control information to be sent via two pieces of control information, the complexity of blind detection by the user is greatly reduced; on the other hand, since different code rates are used when performing link adaptation processing for the second control information according to the quality of channel of each user, that is, different amount of redundancy information are introduced for users with different quality of channel, the signaling overhead is greatly reduced while ensuring the second control information can be accurately received by users at edges.

It is noted that, in addition to the above-described control information, the above-described method may be used to send users other control information, such as control information for system information, power control information and the like.

The above description merely displays preferred embodiments of the present disclosure and is in no way intended to limit the present disclosure. Any modifications, equivalents, improvements and the like made within the spirit and principle of the present disclosure should be encompassed in the scope of the present disclosure.

What is claimed is:

1. A method for transmitting control information in a wireless communication system, comprising:
   pre-assigning a group identification to each user group respectively;
   determining a search space corresponding to each group identification respectively;
   determining a link adaptation method of a user group according to quality of channels of each user in the user group;
   generating contents of first control information according to common control information of all users in the user group and the link adaptation method corresponding to the user group;
   performing cyclic redundancy check for the contents of the first control information, generating the first control information, and transmitting the first control information to each user in the user group;
   performing cyclic redundancy check for particular control information of each user in the user group and obtaining contents of second control information; and
   performing link adaptation process for the contents of the second control information according to the link adaptation method corresponding to the user group, generating the second control information, and transmitting the second control information to each user in the user group.

2. The method according to claim 1, wherein determining a link adaptation method of a user group according to quality of channels of each user in the user group comprises:
   determining code rate to be introduced when performing link adaptation process for control information corresponding to each user respectively according to the quality of the channels of each user in the user group; and
   selecting an appropriate parameter as a parameter for the link adaptation corresponding to the user group according to the determined code rate to be introduced when performing the link adaptation process for the control information corresponding to each user.

3. The method according to claim 2, wherein
   the link adaptation method comprises adjusting code rate of rate matching;
   the link adaptation process comprises rate matching processing; and
   the parameter for the link adaptation comprises a rate matching parameter.

4. The method according to claim 2, wherein
   the link adaptation method comprises adjusting code rate of channel coding;
   the link adaptation process comprises channel coding processing; and
   the parameter for the link adaptation comprises a channel coding parameter.

5. The method according to claim 1, wherein the common control information of all users in the user group comprises resource allocation information and multiplexing order information of data transmission.

6. The method according to claim 5, wherein the first control information comprises a resource allocation field, a multiplexing order field and a link adaptation method field;
   the resource allocation field uses independent bits to indicate the resource allocation information;
   the multiplexing order filed uses independent bits to indicate the multiplexing order information of data transmission; and the link adaptation method field uses independent bits to indicate link adaptation method information.

7. The method according to claim 5, wherein the first control information comprises at least one data field, bits in the data field indicate at least two of the resource allocation information, the multiplexing order information of data transmission and link adaptation method information.

8. The method according to claim 1, further comprising: after performing cyclic redundancy check for the contents of the first control information, scrambling a cyclic redundancy check code generated through the cyclic redundancy check with the group identification of the user group.

9. The method according to claim 1, wherein performing cyclic redundancy check for particular control information of each user in the user group comprises: performing cyclic redundancy check for particular control information of each user in the user group using a manner in which each control information is applied the cyclic redundancy check in a nested mode or a manner in which each control information is applied the cyclic redundancy check independently.

10. The method according to claim 9, further comprising: scrambling a cyclic redundancy check code generated through the cyclic redundancy check with user identification of each user in the user group.

11. A method for receiving control information in a wireless communication system, comprising:
de-mapping a search space corresponding to a group identification of a user group to which a user itself belongs and obtaining candidate first control information;
performing blind detection for the candidate first control information, obtaining first control information sent by a base station, and determining common control information of all users in the user group to which itself belongs and link adaptation method corresponding to the user group to which itself belongs;
de-mapping the search space corresponding to the group identification of the user group to which itself belongs and obtaining candidate second control information; and
performing blind detection for the candidate second control information according to the common control information of all users in the user group to which it belongs and the link adaptation method corresponding to the user group to which itself belongs, and obtaining particular control information of itself and/or of other users.

12. The method according to claim 11, wherein performing blind detection for the candidate second control information according to the common control information of all users in the user group to which itself belongs and the link adaptation method corresponding to the user group to which itself belongs comprises: demodulating the candidate second control information according to the common control information of all users in the user group to which itself belongs; performing rate de-matching, channel decoding and cyclic redundancy check for the demodulated data according to the link adaptation method corresponding to the user group to which itself belongs.

13. The method according to claim 12, wherein when the base station performs cyclic redundancy check for the particular control information of each user in the user group with a manner in which each control information is applied the cyclic redundancy check in a nested mode, the user performs cyclic redundancy check in the order from inside to outside of the cyclic redundancy check;
if the cyclic redundancy check result is correct, the user stops decoding and outputs all of the particular control information of each user decoded;
if the cyclic redundancy check result is incorrect, the user continues to decode and perform the next cyclic redundancy check; and
if there is no any correct cyclic redundancy check result, the user considers itself as not being scheduled.

14. The method according to claim 12, wherein when the base station performs cyclic redundancy check for the particular control information of each user in the user group with a manner in which each control information is applied the cyclic redundancy check independently, the user performs cyclic redundancy check for the particular control information of each user independently;
if there is a correct cyclic redundancy check result, obtaining the particular control information of the corresponding user;
if there is no correct cyclic redundancy check result, the user considers itself as not being scheduled.

15. A base station, comprising:
a configuration unit, for pre-assigning a group identification to each user group respectively, and determining a search space corresponding to each group identification respectively;
a link adaptation method determining unit, for determining a link adaptation method of a user group according to quality of channel of each user in the user group;
a first control information transmitting unit, for generating contents of first control information according to common control information of all users in the user group and the link adaptation method corresponding to the user group, performing cyclic redundancy check for the contents of the first control information, generating the first control information, and then transmitting the first control information to each user in the user group; and
a second control information transmitting unit, for performing cyclic redundancy check for particular control information of each user in the user group, obtaining contents of second control information, performing link adaptation processing for the contents of the second control information according to the link adaptation method corresponding to the user group, generating the second control information, and transmitting the second control information to each user in the user group.

16. The base station according to claim 15, wherein the link adaptation method determining unit comprises:
a first module, for determining code rate to be introduced when performing link adaptation processing for control information corresponding to each user respectively according to the quality of the channel of each user in the user group; and
a second module, for selecting an appropriate parameter as a parameter for the link adaptation method corresponding to the user group according to the determined code rate to be introduced when performing the link adaptation processing for the control information corresponding to each user.

17. The base station according to claim 15, wherein the first control information transmitting unit further scrambles a cyclic redundancy check code generated through the cyclic redundancy check with the group identification of the user group after performing cyclic redundancy check for the contents of the first control information.

18. The base station according to claim 15, wherein when performing cyclic redundancy check for the particular control information of each user in the user group, the second control information transmitting unit uses a manner in which each control information is applied the cyclic redundancy check in a nested mode or a manner in which each control information is applied the cyclic redundancy check independently.

19. The base station according to claim 15, wherein the second control information transmitting unit further scrambles a cyclic redundancy check code generated through the cyclic redundancy check with user identification of each user in the user group.

* * * * *